US012627007B2

(12) United States Patent
Ding et al.

(10) Patent No.: US 12,627,007 B2
(45) Date of Patent: May 12, 2026

(54) BATTERY CONFIGURATION FOR REDUCING ELECTROMAGNETIC INTERFERENCE

(71) Applicant: Google LLC, Mountain View, CA (US)

(72) Inventors: Shengyin Ding, Cupertino, CA (US); Sheba Devan, Pleasanton, CA (US)

(73) Assignee: Google LLC, Mountain View, CA (US)

( * ) Notice: Subject to any disclaimer, the term of this patent is extended or adjusted under 35 U.S.C. 154(b) by 547 days.

(21) Appl. No.: 18/164,316

(22) Filed: Feb. 3, 2023

(65) Prior Publication Data

US 2024/0266692 A1      Aug. 8, 2024

(51) Int. Cl.
| | |
|---|---|
| *H01M 50/55* | (2021.01) |
| *H01M 50/109* | (2021.01) |
| *H01M 50/531* | (2021.01) |
| *H01M 50/559* | (2021.01) |
| *H01M 50/566* | (2021.01) |

(52) U.S. Cl.
CPC ......... *H01M 50/55* (2021.01); *H01M 50/109* (2021.01); *H01M 50/531* (2021.01); *H01M 50/559* (2021.01); *H01M 50/566* (2021.01); *H01M 2220/30* (2013.01)

(58) Field of Classification Search
None
See application file for complete search history.

(56) References Cited

U.S. PATENT DOCUMENTS

2024/0283107 A1 * 8/2024 Su ........................ H01M 50/503

* cited by examiner

*Primary Examiner* — Alix E Eggerding
(74) *Attorney, Agent, or Firm* — Colby Nipper PLLC

(57) ABSTRACT

The present document describes a battery configuration for reducing electromagnetic interference (EMI). The battery configuration includes a coin cell (e.g., stacking battery cell, button cell) with predefined external-tab configurations and a predefined internal-tab angle for reducing electromagnetic (EM) coupling. In particular, internal tabs are positioned to be separated by an angle (e.g., a predefined internal-tab angle) of approximately 90 degrees. External tabs include (i) a first external tab connected to a side of the coin cell and extending to overlap a top surface of the coin cell and (ii) a second external tab connected to the top surface of the coin cell. Both external tabs are positioned relative to the internal tabs to reduce an H-field and/or an E-field created by current running through the coin cell.

20 Claims, 19 Drawing Sheets

Section A–A

1300

1800

114-1

114-2

114-3

100

114

112

408

112-4

112-5 y
x
z

1900 ⟶

Electronic Device
1902

Battery 1904

Battery Connector 1906

Processor(s) 1908

Computer-Readable Media
1910

Application(s) 1912

Operating System 1914

System-Side Connector 1916

Network Interface 1918

Speaker 1920

Display 1922

Enclosure 1924

1902-1

1902-2

1902-3

1902-4

1902-4

1902-6

BATTERY CONFIGURATION FOR REDUCING ELECTROMAGNETIC INTERFERENCE

BACKGROUND

Batteries are a key component for many electronics. Coin cells (e.g., "button batteries") with a small form factor and higher power density are becoming increasingly popular, particularly Lithium (Li) coin cells. Recent developments in small battery-powered devices include wireless earbuds, which have a very small space to package all their components, including an antenna, a main logic board (MLB), a flex circuit, a battery, a speaker module, a microphone, a contact magnet, sensors, and so forth.

Challenges arise, however, in designing and producing device architecture in such small spaces for customers who generally prefer, for example, smaller, lighter, and more comfortable earbuds with a long battery life. Extending the battery life of a device generally requires using a larger-size battery. One solution is to use a system-in-package (SIP) printed circuit board (PCB), which saves space for enlarging a battery size to increase the battery life. However, a larger-size battery has more area to interface with each packaged component, which can cause issues with nearfield coupling, such as unwanted electromagnetic (EM) coupling resulting in electromagnetic interference (EMI) (e.g., cross-talk in electronic circuits). Examples of unwanted EM coupling include an E-field and an H-field from an electric current and/or a static magnetic field from the magnet. EMI may occur between various electronic components, including, for example, between the MLB and the battery, between the battery and a speaker coil of the speaker module, and/or between the flex circuit and the speaker coil.

These nearfield coupling issues may be referred to as e-noise, which is an unwanted signal superimposed on a wanted signal. The e-noise may become apparent as an audible tonal noise (e.g., harmonics including 800 Hertz (Hz), 1600 Hz, 3200 Hz) via the speaker and may be recognized by a user as crackling, humming, buzzing, and/or hissing sounds, which degrades audio quality and diminishes the user experience.

SUMMARY

The present document describes battery configuration for reducing electromagnetic interference (EMI). The battery configuration includes a battery, such as a coin cell (e.g., stacking battery cell, button cell) with predefined external-tab configurations and a predefined internal-tab angle for reducing electromagnetic (EM) coupling. In particular, internal tabs are positioned to be separated by an angle (e.g., a predefined internal-tab angle) of approximately 90 degrees. External tabs include (i) a first external tab connected to a side of the coin cell and extending to overlap a top surface of the coin cell and (ii) a second external tab connected to the top surface of the coin cell. Both external tabs are positioned relative to the internal tabs to reduce an H-field and/or an E-field created by electric current running through the coin cell.

In an example, a battery is disclosed. The battery includes a battery can comprising a top can and a bottom can. The top can is disposed at least partially within the bottom can to provide an enclosure having a central axis. Further, the top can defines a top of the enclosure and the top has a top exterior surface defining an xy-plane. The bottom can defines a base and a sidewall of the enclosure. The sidewall is substantially orthogonal to the xy-plane. Additionally, the battery can is insulated over exterior surfaces of the battery can. The battery also includes a plurality of layers stacked within the enclosure between the base and the top. In addition, the battery includes an internal negative tab, an internal positive tab, an external negative tab, and an external positive tab. The internal negative tab provides current to the plurality of layers and is adjacent to a first location on an interior surface of the sidewall of the enclosure. The internal positive tab collects the current within the plurality of layers and is adjacent to a second location on the interior surface of the sidewall of the enclosure that is different from the first location. The external negative tab is connected to the top exterior surface of the enclosure at a third location and defines a negative terminal for the battery. The external positive tab is connected to an exterior surface of the sidewall of the enclosure at a fourth location and defines a positive terminal for the battery. The central axis is between the fourth location on the exterior surface of the sidewall and the second location on the interior surface of the sidewall.

In another example, a coin cell is disclosed. The coin cell includes a battery can, an internal negative tab, an internal positive tab, an external negative tab, and an external positive tab. The battery can has a positive terminal, a negative terminal, and a general cylindrical shape with a central axis. The internal negative tab is disposed within the battery can and configured to connect a plurality of cathode layers to the negative terminal. The internal positive tab is disposed within the battery can and configured to connect a plurality of anode layers to the positive terminal. The external negative tab is connected to the negative terminal. The external positive tab is connected to the positive terminal. In addition, the external negative tab and the external positive tab are disposed at locations that are predefined relative to the internal positive tab and the internal negative tab to reduce an H-field generated when current runs through the coin cell. The central axis is located between the external positive tab and the internal positive tab. Further, the H-field is reduced in a volume over the negative terminal that is on an opposing side of the external positive tab from the external negative tab.

This summary is provided to introduce simplified concepts of a battery configuration for reducing electromagnetic interference, which are further described below in the Detailed Description. This summary is not intended to identify essential features of the claimed subject matter.

BRIEF DESCRIPTION OF THE DRAWINGS

The details of one or more aspects of a battery configuration for reducing electromagnetic interference are described in this document with reference to the following drawings. The same numbers are used throughout the drawings to reference like features and components.

DETAILED DESCRIPTION

The present document describes a battery configuration for reducing electromagnetic interference. Electric current running through the battery generates a magnetic field, which can induce nearfield coupling (e.g., electromagnetic coupling) with a nearby electronic circuit and cause unwanted electromagnetic interference. In some examples, this nearfield coupling is presented in the form of e-noise, which can produce an audible tonal sound (e.g., crackling, humming) via a speaker. The battery configuration described herein includes external tabs that are configured (e.g., size, shape, location) relative to the position of internal tabs on the battery (e.g., coin cell), which reduces EM coupling by reducing the H-field and/or the E-field generated when electric current runs through the battery. The external tabs are configured to create a low-field zone (e.g., H-field, E-field), which can be used for EM coupling with the nearby electronic circuit.

Thus, a battery is provided for devices (e.g., small form factor devices) that reduces EMI (e.g., e-noise) typically created between a battery and a nearby electronic component (e.g., speaker, MLB, circuit). The disclosed battery configuration thereby increases the effectiveness, efficiency, and user satisfaction with devices and systems using the battery.

While features and concepts of the described techniques for a battery configuration for reducing electromagnetic interference can be implemented in any number of different environments, aspects are described in the context of the following examples. The examples described herein that discuss current flow are described with respect to when the battery is discharging under load. Accordingly, when charging the battery, the direction of the current is opposite to the direction described herein.

Example Device

Figure 1:
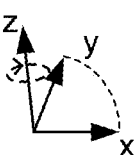
FIG. 1 is an example implementation of a battery configuration for reducing electromagnetic interference.
Figure 1:
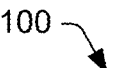
Figure 1:
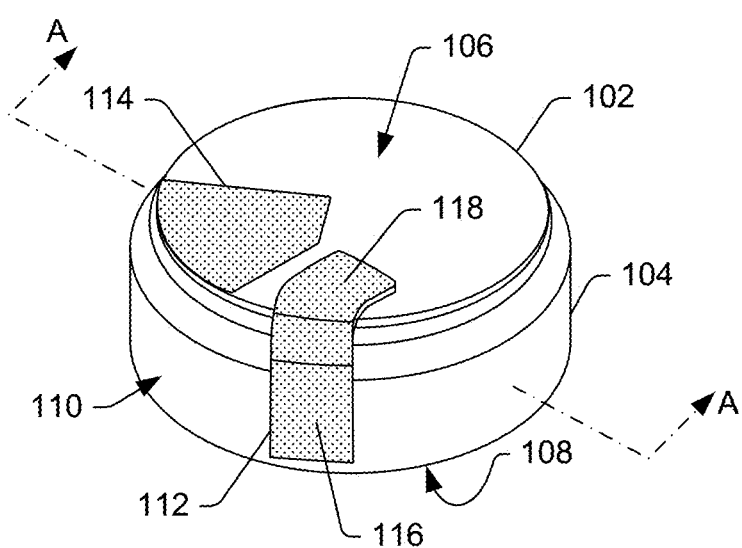

FIG. 1 is an example implementation of a battery configuration for reducing electromagnetic interference. The illustrated example includes a battery, such as a coin cell 100 (e.g., lithium battery) having an enclosure (e.g., can, battery can), which includes a top can 102 and a bottom can 104. In aspects, the top can 102 defines a top 106 of the coin cell 100 and the bottom can 104 defines a base 108 and a sidewall 110 of the coin cell 100. The top can 102 forms a negative terminal on the top 106, and the bottom can 104 forms a positive terminal on both the base 108 and the sidewall 110. The coin cell 100 also includes external tabs (e.g., external positive tab 112, external negative tab 114), which are positioned relative to internal tabs (not shown in FIG. 1) of the coin cell 100. In one example, the external positive tab 112 is an anode tab and the external negative tab 114 is a cathode tab.

The external negative tab 114 is connected (e.g., welded, soldered) to an exterior surface of the top 106 of the coin cell 100. The external positive tab 112 is connected (e.g., welded, soldered) to an exterior surface of the sidewall 110 of the coin cell 100. In addition, the external positive tab 112 extends toward and overlaps with the top 106 without connecting to the top 106. The external positive tab 112 is curved or bent such that a first portion 116 of the external positive tab 112 is parallel to the sidewall 110 of the coin cell 100 and a second portion 118 of the external positive tab 112 is parallel to the exterior surface of the top 106 of the coin cell 100. The position and orientation of the external negative tab 114 and the external positive tab 112 are defined relative to positions of the internal tabs (described in further detail below) to reduce EM coupling with an electronic component in proximity to the top 106 of the enclosure.

Figure 2:
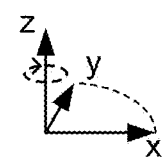
FIG. 2 illustrates a perspective view of the example coin cell from FIG. 1 in further detail.
Figure 2:
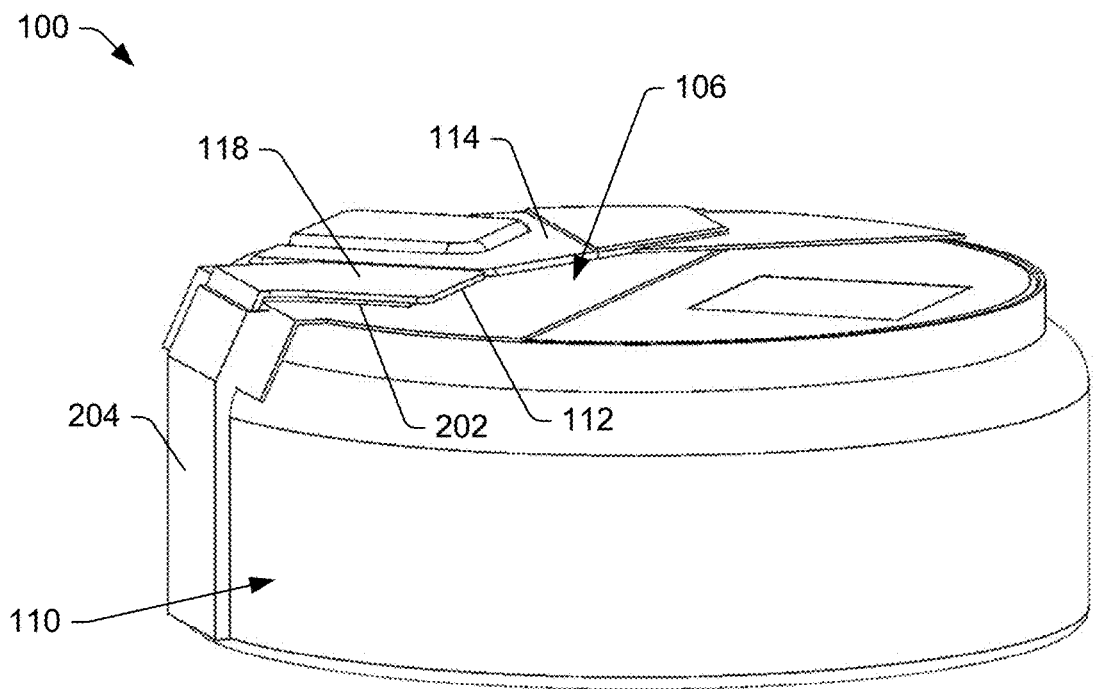

FIG. 2 illustrates a perspective view of the example coin cell 100 from FIG. 1 in further detail. As illustrated, the external negative tab 114 is connected to the exterior surface of the top 106 of the coin cell 100. The second portion 118 of the external positive tab 112 is proximate to the top 106 of the coin cell 100 but separated from the exterior surface of the top 106 by a separating layer 202, which includes a non-conductive material (e.g., pressure-sensitive adhesive (PSA)). The first portion 116 of the external positive tab 112 may be between a cover 204 and the sidewall 110 of the coin cell 100. The cover 204 may protect (e.g., insulate) the first portion 116 of the external positive tab 112 from physical contact with one or more components or parts of an electronic device in which the coin cell 100 is assembled.

Further, the exterior surfaces of the enclosure, or cell can, are insulated (e.g., include an insulating layer) to prevent the exterior surfaces of the coin cell 100 can from interfacing electrically with adjacent components. The external tabs 112 and 114 are each connected to the can of the coin cell 100 via one or more weld points that extend through the insulating layer for conductivity. Accordingly, instead of using the cell can, the external tabs 112 and 114 are disposed at specific locations (e.g., both on the exterior surface of the top 106), which are usable to interface with one or more electrical components (e.g., MLB, PCB).

Figure 3A:
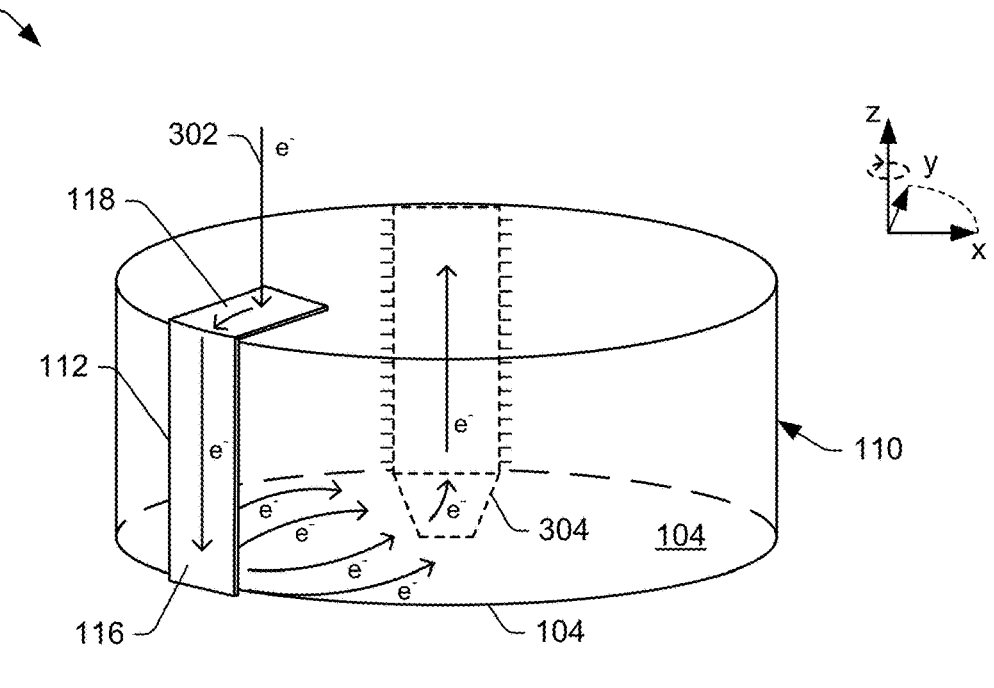
FIGS. 3A and 3B illustrate examples of electron flow into and out of, respectively, the example coin cell from FIG. 1 during discharge of the coin cell.
Figure 3B:
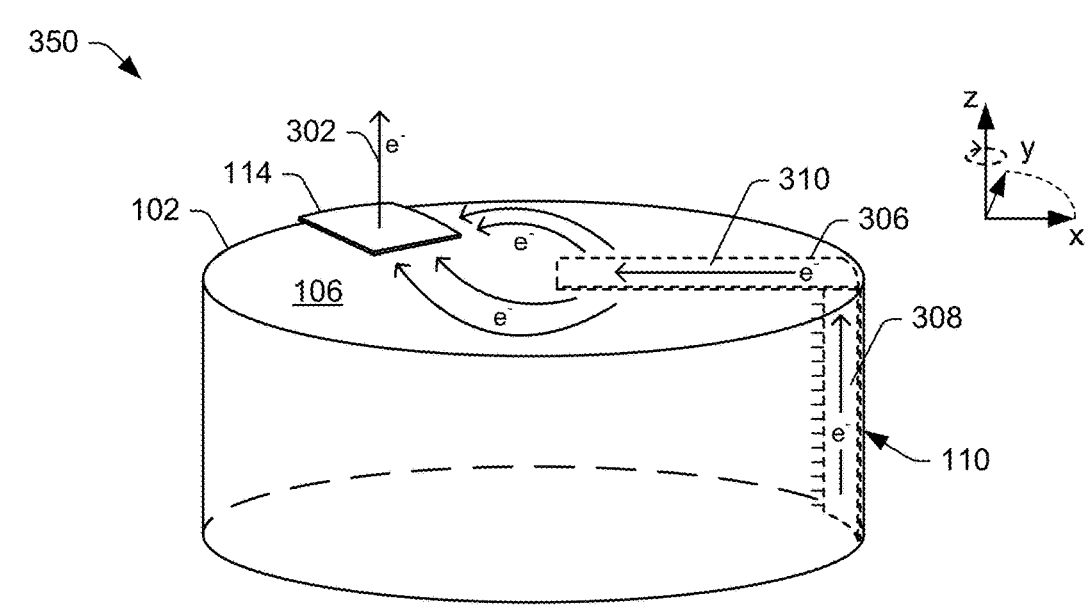

FIG. 3A illustrates an example 300 of electron flow into the coin cell 100 from FIG. 1 during discharge of the coin cell 100. FIG. 3B illustrates an example 350 of electron flow out the coin cell 100 from FIG. 1 during discharge of the coin cell 100. When discharging, electrons 302 flow from an electrically connected device (not shown) and into the second portion 118 of the external positive tab 112 toward the first portion 116 of the external positive tab 112. The electrons then flow from the first portion 116 of the external positive tab 112 into the bottom can 104 across the base 108 of the bottom can 104. Inside the coin cell 100 is an internal positive tab 304, which is electrically connected to the bottom can 104 and collects the electrons flowing through the base 108 of the bottom can 104. The internal positive tab 304 is a current collector. The electrons flow through the internal positive tab 304 up the side of the coin cell 100 and are distributed to a plurality of cathode layers (described with respect to FIG. 4) within the coin cell 100.

Continuing in FIG. 3B, electrons flow to into an internal negative tab 306 from a plurality of anode layers (described with respect to FIG. 4) within the coin cell 100. The internal negative tab 306 is a current collector. The electrons flow along a first portion 308 of the internal negative tab 306, which is proximate an internal surface of the sidewall 110 of the coin cell 100, and toward a second portion 310 of the internal negative tab 306, which is proximate to an internal surface of the top 106 of the coin cell 100. The internal negative tab 306 is electrically connected to the top can 102. Accordingly, the electrons flow from the internal negative tab 306 to the top can 102. Then, the electrons flow from the top can 102 to the external negative tab 114 and out to the electrically connected device. Further examples described herein are described with respect to current flow during discharge of the battery.

Figure 4:
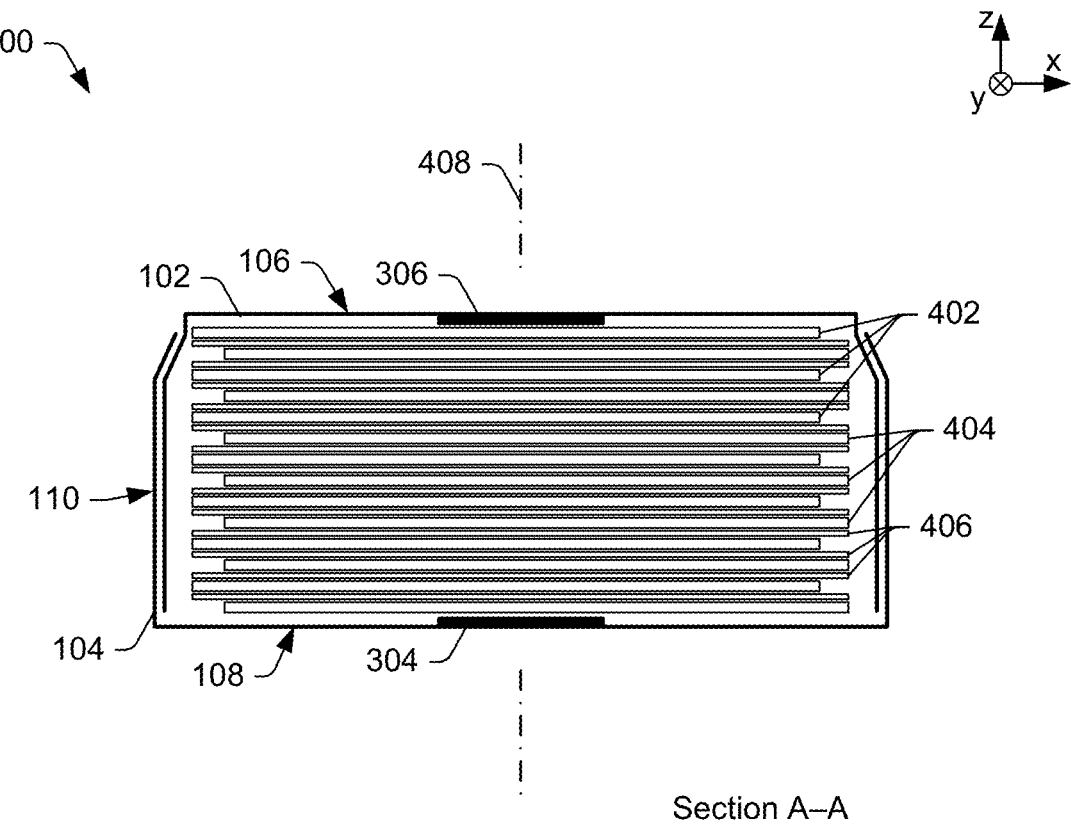
FIG. 4 illustrates a sectional view of the example coin cell from FIG. 1, taken at line A-A in FIG. 1.

FIG. 4 illustrates a sectional view of the example coin cell 100 from FIG. 1, taken at line A-A in FIG. 1. As illustrated, the coin cell 100 includes a plurality of layers stacked within a cell can (e.g., battery cell can). The cell can includes the top can 102 and the bottom can 104 assembled together to form an enclosure. The cell can may include a rigid and electrically conductive material (e.g., metal, metal alloy). The bottom can 104 has a cup-like shape with a cylindrical sidewall, a closed end (e.g., base 108), and an open end (e.g., opening). The top can 102 has a cup-like shape with a cylindrical sidewall, a closed end (e.g., top), and an open end (e.g., opening). A diameter of the bottom can 104 is greater than a diameter of the top can 102. The top can 102 is disposed at least partially within the bottom can 104. For example, the top can 102 is inserted into the opening of the bottom can 104 such that the opening of the top can 102 is disposed proximate to an interior surface of the base 108 of the bottom can 104 and the opening of the bottom can 104 is disposed proximate to an interior surface of the top 106 of the top can 102. In this way, the top can 102 and the bottom can 104 together form the enclosure. The enclosure may thus have a general cylindrical shape with positive and negative terminals at opposing ends of the cylindrical shape. The top can 102 and the bottom can 104 are separated by an insulator to prevent physical contact between the top can 102 and the bottom can 104.

The coin cell 100 has a plurality of layers stacked within the enclosure formed by the cell can. In an example, the layers are stacked parallel to the base 108 and/or top 106 of the cell can. The layers include at least one anode layer 402, at least one cathode layer 404, and at least one separator 406 between each anode layer 402 and cathode layer 404. The separator 406 is an electrochemically inactive, thin, porous membrane that physically separates the anode layer 402 from the cathode layer 404 to prevent a short circuit, while permitting ion transport to occur. The separator 406 may be a polymeric membrane moistened by or soaked in an electrolyte that acts as a catalyst to increase the movement of ions from one electrode (anode or cathode) to the other electrode. Additional layers and/or components may be included within the coin cell 100, including a spring, a spacer, wire, etc. Using a plurality of anode and cathode layers, the coin cell 100 may have more volume with higher power density. The internal positive tab 304 is electrically connected to an interior surface of the base 108 of the coin cell 100, whereas the internal negative tab 306 is electrically connected to an interior surface of the top 106 of the coin cell 100. Typically, the internal positive tab 304 is connected to each cathode layer, whereas the internal negative tab 306 is connected to each anode layer. Then, each internal tab is folded from the side to the top or the bottom, resulting in the internal tabs 304 and 306 each having a general "L" shape (not shown in FIG. 4). In one example, the internal negative tab 306 extends along the interior surface of the sidewall 110 (e.g., in the z-direction) to the interior surface of the top, and the internal positive tab 304 extends along the interior surface of the sidewall 110 (e.g., in the z-direction) to the interior surface of the base 108. In this way, the internal negative tab 306 is configured to electrically connect the plurality of cathode layers 404 to the negative terminal. Similarly, the internal positive tab 304 is configured to electrically connect the plurality of anode layers 402 to the positive terminal.

As described in further detail herein, the internal positive tab 304 and the internal negative tab 306 are separated by a predefined angle (e.g., internal-tab angle) in the xy-plane. The predefined angle is a central angle, which is an angle whose vertex is located on a central axis 408 of the coin cell 100 (or of the enclosure), where the central axis 408 is parallel to the z-axis. In the examples described herein, the predefined central angle is formed in the xy-plane (described in further detail with respect to FIG. 9). Different positions of each of the internal tabs 304 and 306 relative to one another cause different current paths on the cell can, which may contribute to e-noise.

Figure 5A:
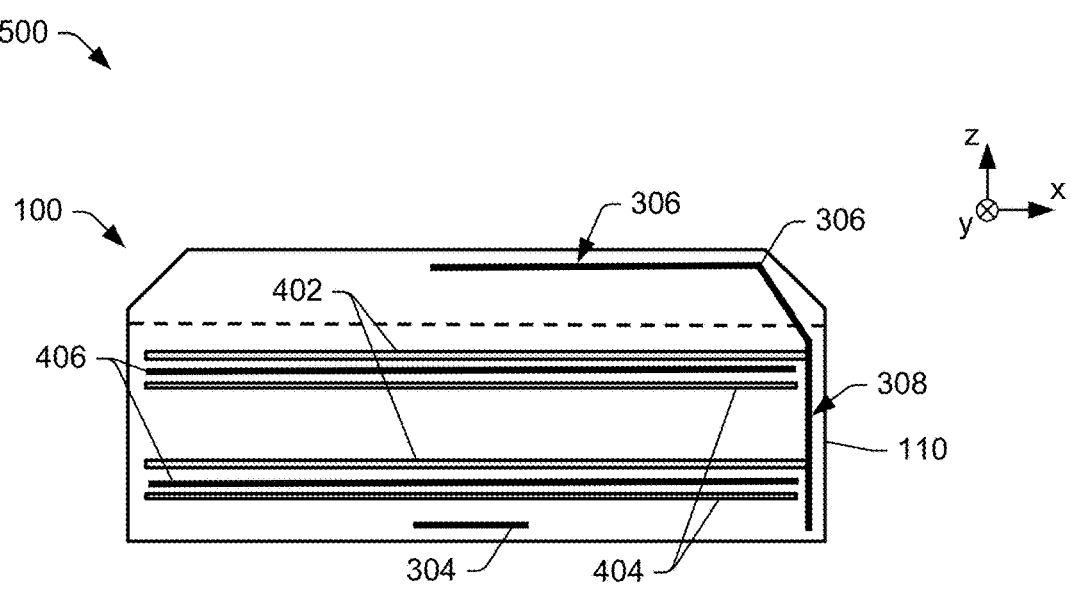
FIGS. 5A and 5B illustrate simplified sectional views of the example coin cell from FIG. 1.
Figure 5B:
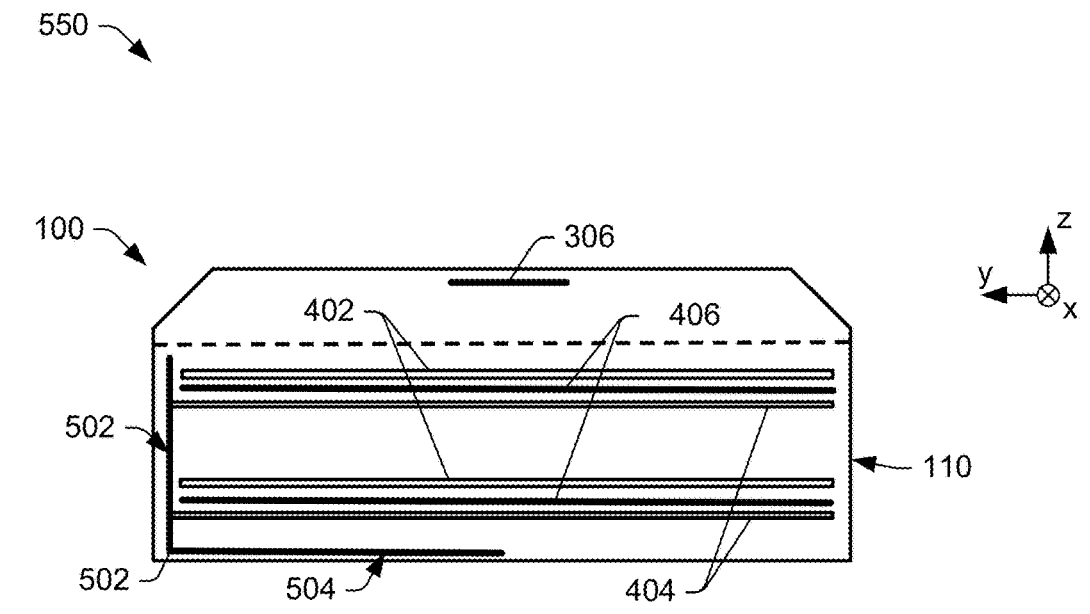

FIGS. 5A and 5B illustrate a simplified sectional view 500 and a simplified section view 550, respectively, of the example coin cell 100 from FIG. 1. In particular, FIG. 5A shows a side view of an internal negative tab (e.g., the internal negative tab 306) and FIG. 5B shows a side view of an internal positive tab (e.g., the internal positive tab 304). For simplicity, the external tabs 112 and 114 are omitted from FIGS. 5A and 5B. In FIG. 5, the internal negative tab 306 extends from the sidewall 110 to the top 106 of the coin cell 100, forming a general "L" shape inside the coin cell 100. Here, the cathode layer(s) 404 are connected to the first portion 308 of the internal negative tab 306. The second portion 310 of the internal negative tab 306 is located proximate to the top 106 of the coin cell 100 and extends toward a center of the top 106 of the coin cell 100. As illustrated in FIG. 5B, the internal positive tab 304 extends from the sidewall 110 to the bottom (base 108) of the coin cell 100, forming a general "L" shape inside the coin cell 100. Here, the anode layer(s) 402 are connected to a first portion 502 of the internal positive tab 304. A second portion 504 of the internal positive tab 304 is located proximate to the base 108 of the coin cell 110 and extends toward a center of the base 108 of the coin cell 100.

Figure 6A:
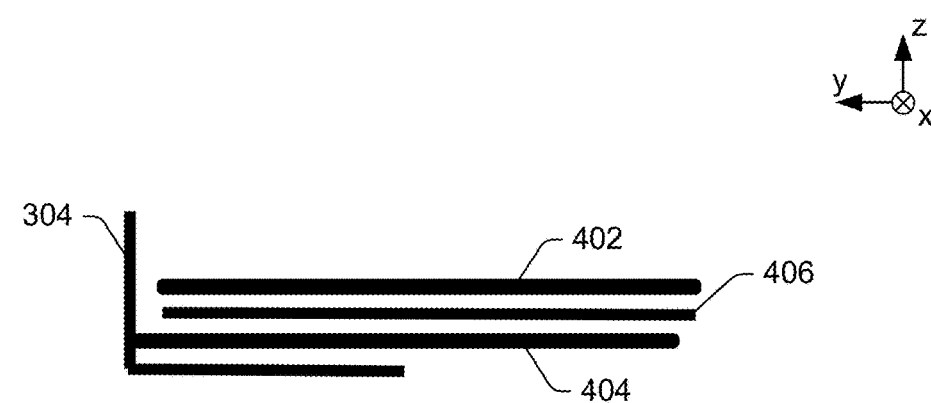
FIG. 6A illustrates a simplified view of an internal positive tab and a portion of layers stacked within a cell can.

FIG. 6A illustrates a simplified view of an internal positive tab (e.g., the internal positive tab 304) and a portion of layers stacked within a cell can. The anode layer(s) 402 connect to the internal positive tab 304. The cathode layer(s) 404 and the separator(s) 406 do not connect to the internal positive tab 304.

Figure 6B:
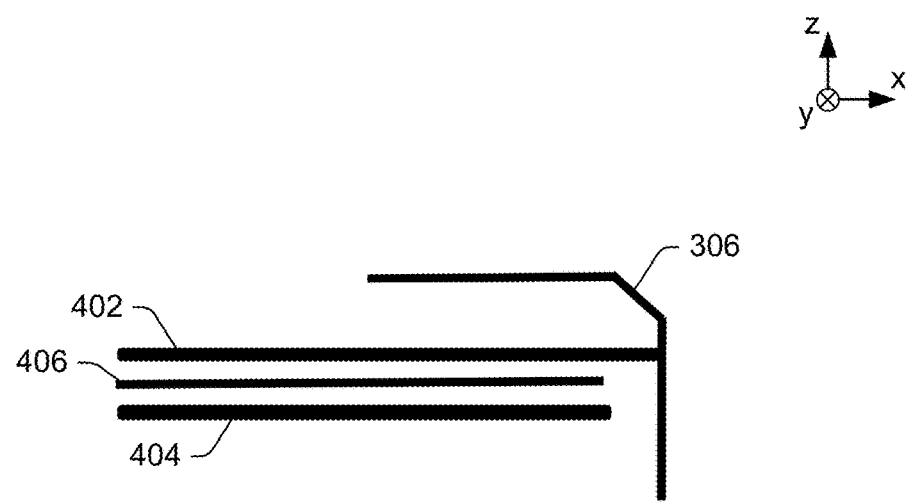
FIG. 6B illustrates a simplified view of the internal negative tab and a portion of the layers stacked within the cell can.

FIG. 6B illustrates a simplified view of an internal negative tab (e.g., the internal negative tab 306) and a portion of the layers stacked within the cell can. The cathode layer(s) 404 connect to the internal negative tab 306. The anode layer(s) 402 and the separator(s) 406 do not connect to the internal negative tab 306.

Figure 7A:
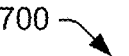
FIG. 7A illustrates a simplified view of a portion of the example coin cell from FIG. 1 including the internal positive tab and the internal negative tab.

FIG. 7A illustrates a simplified view 700 of a portion of the example coin cell 100 from FIG. 1 including the internal positive tab 304 and the internal negative tab 306. In particular, FIG. 7A indicates the direction of electric current 702 on the internal positive tab 304. For example, the electric current 702 runs downward from the top 106 of the coin cell 100 toward the base 108.

Figure 7A:
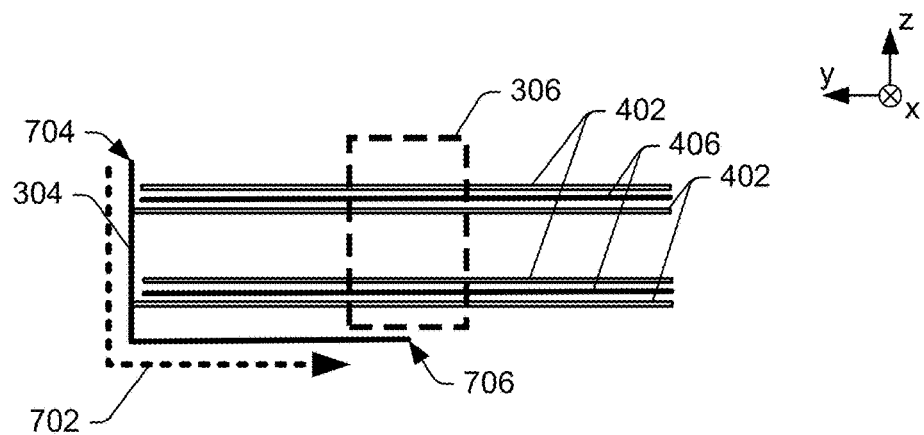
Figure 7B:
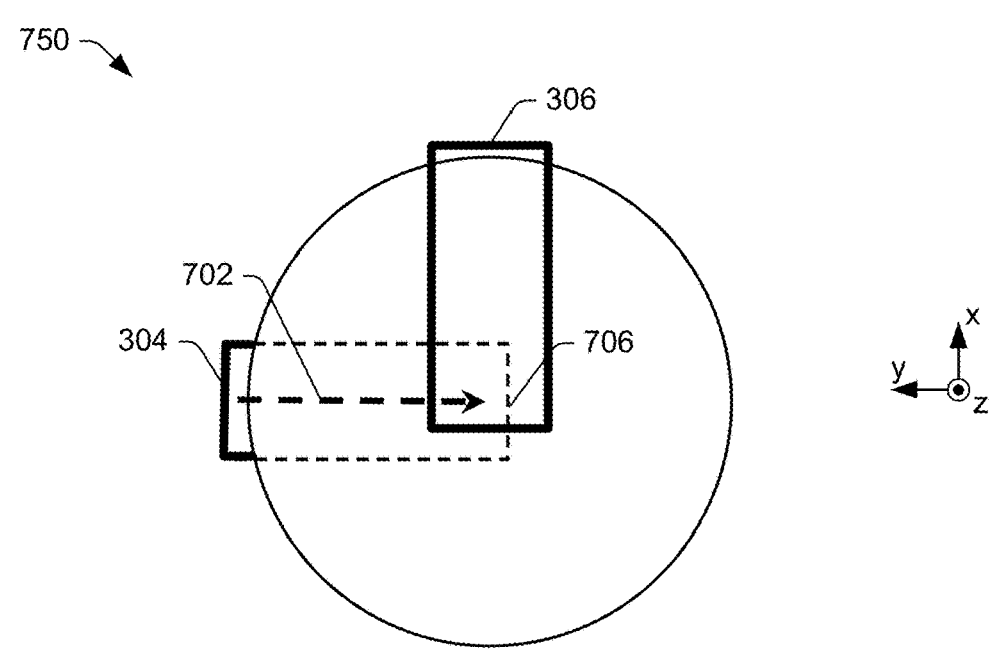
FIG. 7B illustrates a simplified top plan view of the example coin cell from FIG. 1 including the internal positive tab and the internal negative tab.

FIG. 7B illustrates a simplified top plan view 750 of the example coin cell 100 from FIG. 1 including the internal positive tab 304 and the internal negative tab 306. In particular, FIG. 7B indicates the direction of the electric current 702 on the internal positive tab 304. For example, the current runs through the internal positive tab 304 toward a center of the coin cell 100 (e.g., from a first end 704 (shown in FIG. 7A) of the internal positive tab 304, where the internal positive tab 304 is adjacent to the sidewall 110 of the coin cell 100, toward a second end 706 (shown in FIG. 7B) of the internal positive tab 304, where the internal positive tab 304 is connected to the base 108 of the coin cell 100).

Figure 8A:
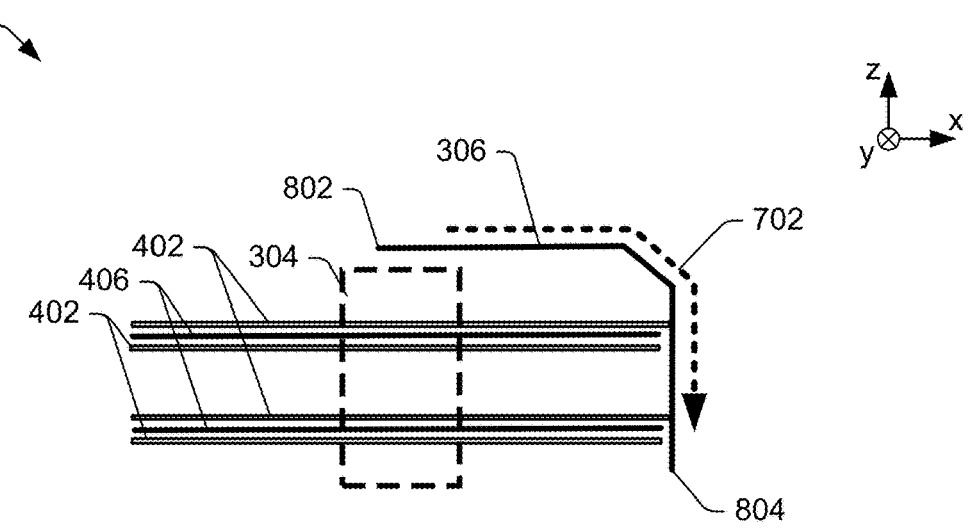
FIG. 8A illustrates another simplified view of a portion of the example coin cell from FIG. 1 including the internal negative tab and the internal positive tab.

FIG. 8A illustrates another simplified view 800 of a portion of the example coin cell 100 from FIG. 1 including the internal negative tab 306 and the internal positive tab 304. In particular, FIG. 8A indicates the direction of the electric current 702 on the internal negative tab 306. For example, the current runs through the internal negative tab 306 from a weld point at a first end 802 of the internal negative tab 306, where the internal negative tab 306 is connected to the top 106 of the coin cell 100 (e.g., proximate the center of the coin cell 100), toward a second end 804 of the internal negative tab 306, where the internal negative tab 306 is adjacent to the sidewall 110 (shown in FIG. 4) of the coin cell 100.

Figure 8B:
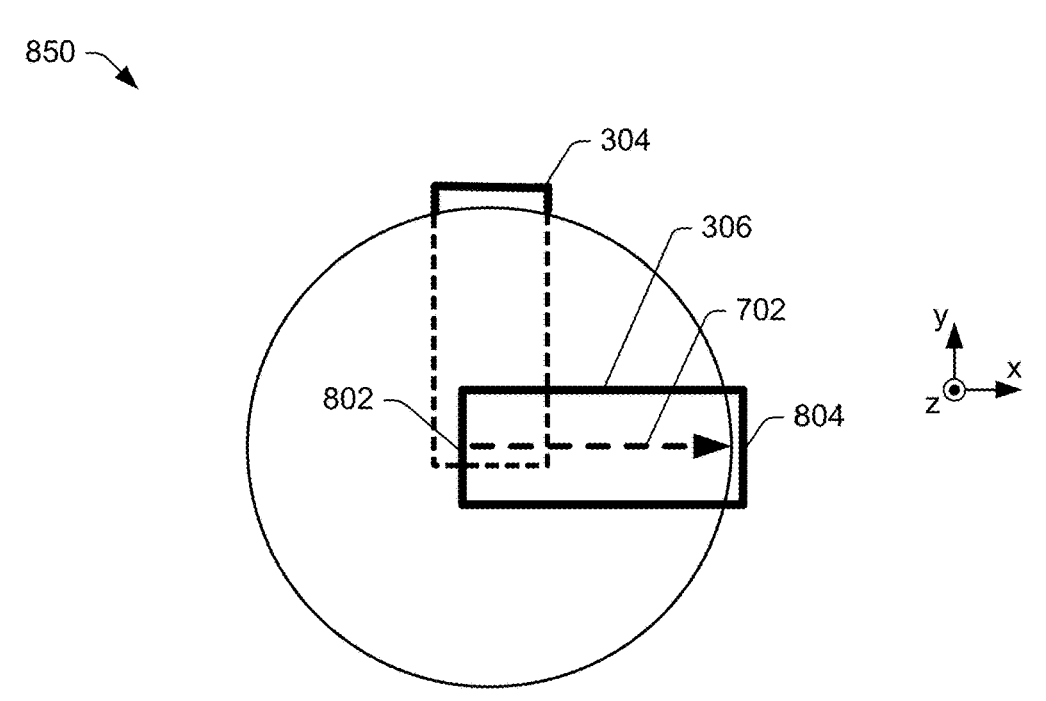
FIG. 8B illustrates a simplified top plan view of the example coin cell from FIG. 1 including the internal positive tab and the internal negative tab.

FIG. 8B illustrates a simplified top plan view 850 of the example coin cell 100 from FIG. 1 including the internal positive tab 304 and the internal negative tab 306. In particular, FIG. 8B indicates the direction of the electric current 702 on the internal negative tab 306. For example, the electric current 702 runs from the first end 802 near the center of the top 106 toward the sidewall 110.

Figure 9:
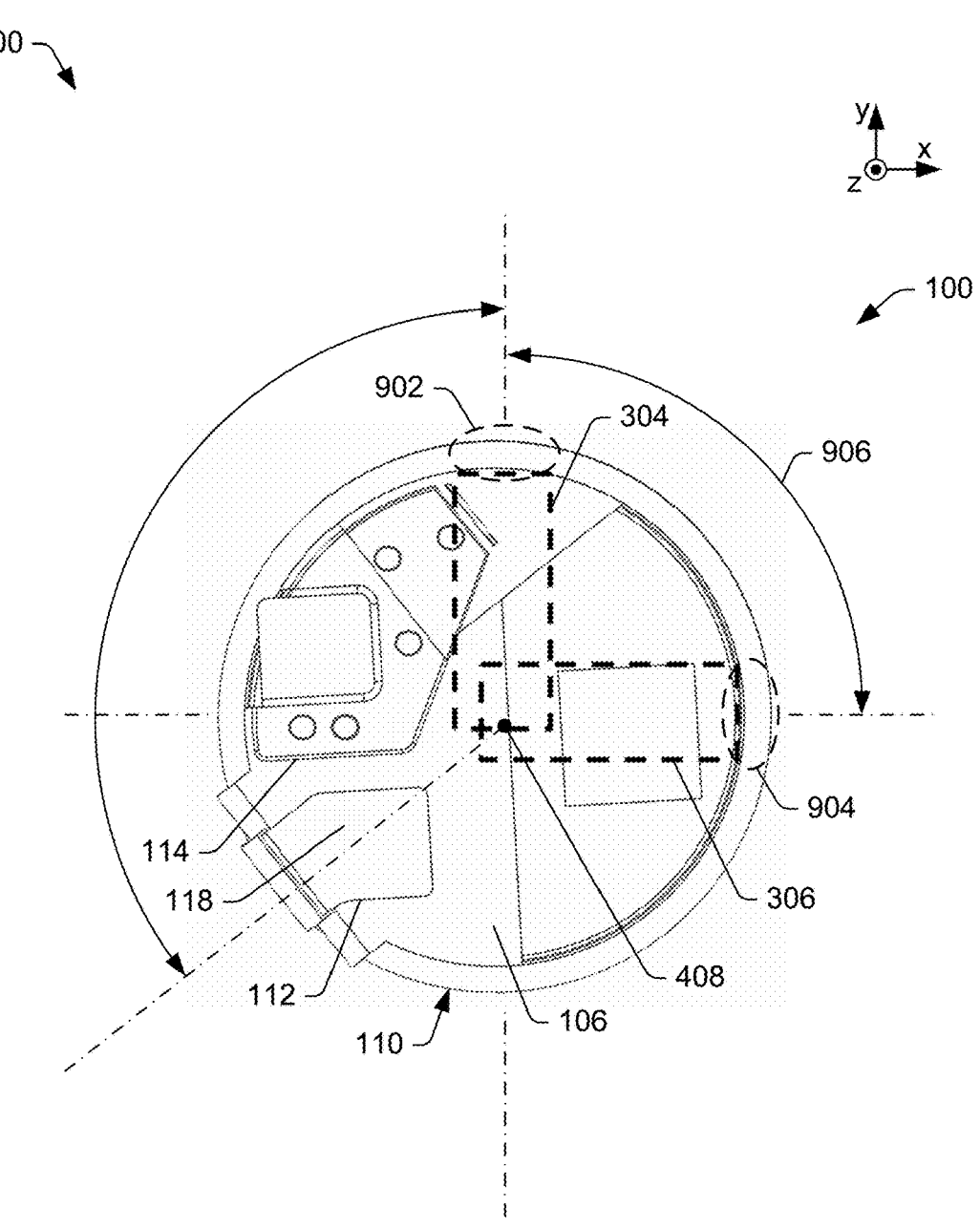
FIG. 9 illustrates a top plan view of the coin cell from FIG. 1.

FIG. 9 illustrates a top plan view 900 of the coin cell 100 from FIG. 1. Here, the internal tabs (e.g., internal negative tab 306 and internal positive tab 304) are represented with dashed lines in the illustration. The internal tabs 304 and 306 extend from an interior surface of the sidewall 110 of the coin cell 100 toward the top 106 or the base 108 of the coin cell 100. In particular, the internal positive tab 304 extends from a first location 902 on an interior surface of the sidewall 110 to an interior surface of the base 108 (shown in FIG. 3A) of the coin cell 100, whereas the internal negative tab 306 extends from a second, different location 904 on the interior surface of the sidewall 110 toward an interior surface of the top 106 of the coin cell 100.

With respect to the central axis 408, the first and second locations 902 and 904 on the sidewall 110 are approximately 90 degrees apart (e.g., internal-tab angle 906), or a distance equal to about one-quarter of the circumference (e.g., circumferential length) of the coin cell 100.

The positions of the external tabs 112 and 114 relative to the internal tabs 304 and 306 can affect the H-field performance, which in turn can increase or decrease e-noise when coupled with a speaker, for example. Assuming an xyz-coordinate system with its origin at the central axis 408, the internal negative tab 306 extends along the x-axis (at, e.g., 0°) and the internal positive tab 304 extends along the y-axis (at, e.g., 90°). Relative to these internal tabs 304 and 306, the external positive tab 112 may be located in the third quadrant (e.g., between 180° and) 270°, or within a range of 90° to 180° from the first location 902 where the internal positive tab 304 connects to the sidewall 110. In one example, the external positive tab 112 is located at approximately 225° relative to the internal negative tab 306 (or 135° relative to the internal positive tab 304). Also, both the external positive tab 112 and the external negative tab 114 are illustrated as being disposed in the second and third quadrants (e.g., on an opposing side of the central axis 408 from the internal negative tab 306 or from the second location 904 on the sidewall 110, where the internal negative tab 306 is adjacent to the sidewall 110). Such a location of the external positive tab 112 may be implemented in, for example, a right-side wireless earbud. Accordingly, such a configuration may be referred to as a right-side battery configuration and is configured for a wireless earbud to be worn in a user's right ear.

Figure 12:
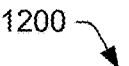
FIG. 12 illustrates a top plan view of a coin cell for a left-side wireless earbud.
Figure 12:
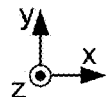
Figure 12:
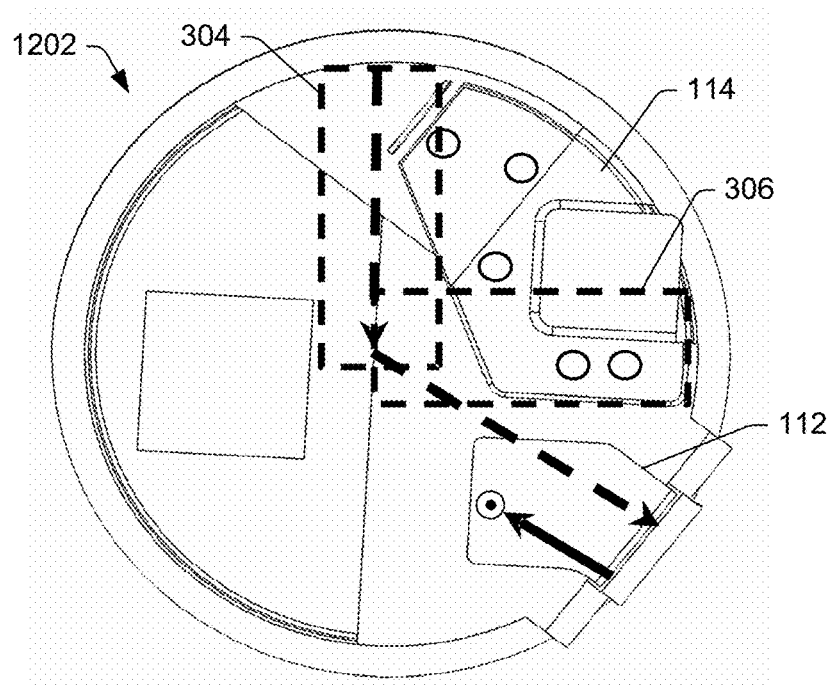

In some aspects, the external positive tab 112 may be located in the fourth quadrant (e.g., between 270° and 360°) relative to the internal negative tab 306, or within a range of −90° to −180° (or 180° to 270°) from the internal positive tab 304. In one example, the external positive tab 112 is located at approximately 315° relative to the internal negative tab 306 (or −135° relative to the internal positive tab 304). Also, both the external positive tab 112 and the external negative tab 114 may be disposed in the first and fourth quadrants (e.g., on the same side of the central axis 408 as the internal negative tab 306 or as the second location 904, where the internal negative tab 306 is adjacent to the sidewall 110). An example of such a configuration is illustrated in FIG. 12. Such a location of the external positive tab 112 may be implemented in, for example, a left-side wireless earbud. Accordingly, such a configuration may be referred to as a left-side battery configuration and is configured for a wireless earbud to be worn in a user's left ear.

The external negative tab 114 may be located substantially in the second quadrant (e.g., between 90° and 180°). There may be some overlap of the external negative tab 114 into the first and/or third quadrants. Further, the external negative tab 114 may overlap (in the z-direction) a portion of the internal positive tab 304. Such a configuration may be implemented in, for example, a right-side wireless earbud.

In another implementation, the external negative tab 114 may be located substantially in the first quadrant (e.g., between 0° and 90°). There may be some overlap of the external negative tab 114 into the second and/or fourth quadrants. Further, the external negative tab 114 may overlap (in the z-direction) portions of each of the internal negative tab 306 and the internal positive tab 304. Such a configuration may be implemented in, for example, a left-side wireless earbud.

However, the external positive tab 112 is positioned substantially opposite the internal positive tab 304 (e.g., located such that the central axis 408 is between the first portion 116 of the external positive tab 112 and a portion of the internal positive tab 304 that connects to the sidewall 110). The arrangement of external tab locations relative to internal tab locations, as described herein, optimizes the H-field to reduce e-noise when coupled to a speaker. In one example, the arrangement of the external tab locations relative to the internal tab locations, as described herein, reduces harmonics associated with 800 Hz, 1600 Hz, and 3200 Hz.

Figure 10:
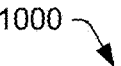
FIG. 10 illustrates a top plan view of a coin cell for a right-side wireless earbud.
Figure 10:
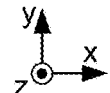
Figure 10:
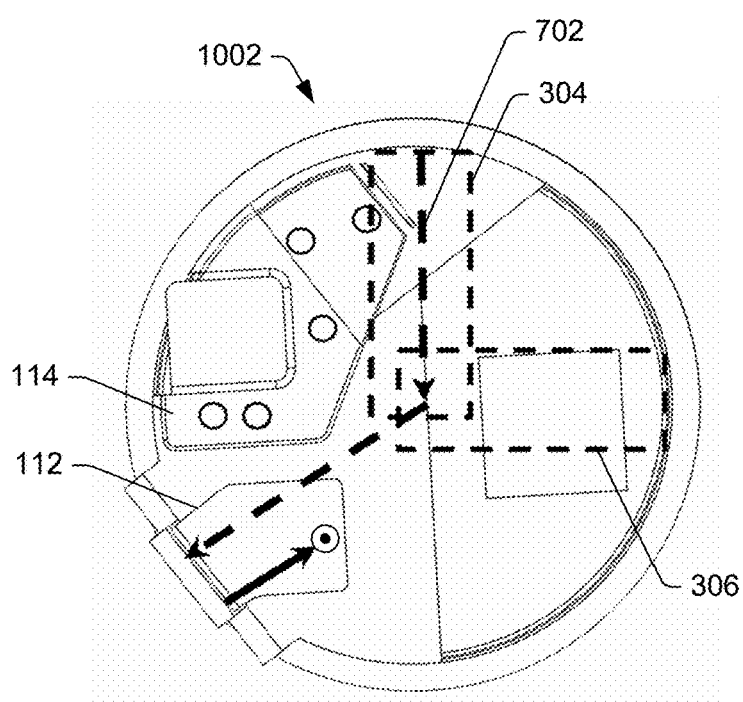

FIG. 10 illustrates a top plan view 1000 of a coin cell (e.g., coin cell 100) for a right-side wireless earbud. In aspects, the coin cell illustrated in FIG. 10 may be referred to as a "right-side battery" 1002. The illustrated example indicates a direction of the electric current 702, which runs from the internal positive tab 304 to the external positive tab 112 and out to an electrically connected device. Both the internal positive tab 304 and the internal negative tab 306 have electric current on the side of the cell can (as described above with respect to FIGS. 7A, 7B, 8A, and 8B), and the direction of the current in each internal tab is opposite the other, which causes a strong H-field between the internal tabs 304 and 306. In particular, the H-field is strongest in the center region of the coin cell 100 and therefore, if the coin cell 100 is packaged with a speaker, the H-field may cause EMI in the form of e-noise through a speaker.

Figure 11:
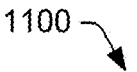
FIG. 11 illustrates a perspective view of the right-side battery from FIG. 10.
Figure 11:
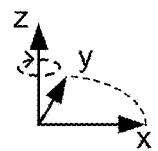
Figure 11:
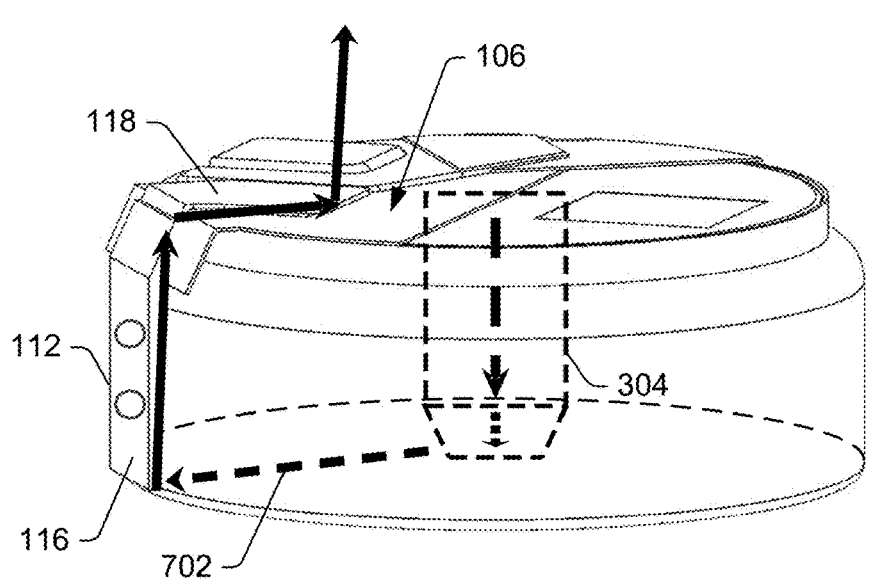

FIG. 11 illustrates a perspective view 1100 of the right-side battery 1002 from FIG. 10. Here, the path of the electric current 702 runs from the internal positive tab 304 to the external positive tab 112. In particular, the electric current 702 runs from the internal positive tab 304 to the first portion 116 of the external positive tab 112 and toward the second portion 118 of the external positive tab 112, which overlaps the top 106 (e.g., negative terminal) of the right-side battery 1002. Then, the electric current 702 exits the second portion 118 of the external positive tab 112 and runs to an electrically connected device.

FIG. 12 illustrates a top plan view 1200 of a coin cell (e.g., coin cell 100) for a left-side wireless earbud. In aspects, the coin cell illustrated in FIG. 12 may be referred to as a "left-side battery" 1202. The arrows indicate the direction of the current 702, which runs from the internal positive tab 304 to the external positive tab 112 through the surface of the battery can and out to an electrically connected device. Both the internal positive tab 304 and the internal negative tab 306 have current on the side (e.g., z-direction) of the can, and the direction of the current in each internal tab is opposite the other, which causes a strong H-field between the internal tabs. In particular, the H-field is strongest in the center region of the coin cell 100 and therefore may cause e-noise if packaged with a speaker.

Notice that the position and orientation of the external tabs 112 and 114 on the left-side battery 1202 are mirrored relative to the external tabs 112 and 114 on the right-side battery 1002 in FIG. 10. In this way, the orientation of the battery in each of the left and right earbuds is the same but the path of the electric current differs.

Figure 13:
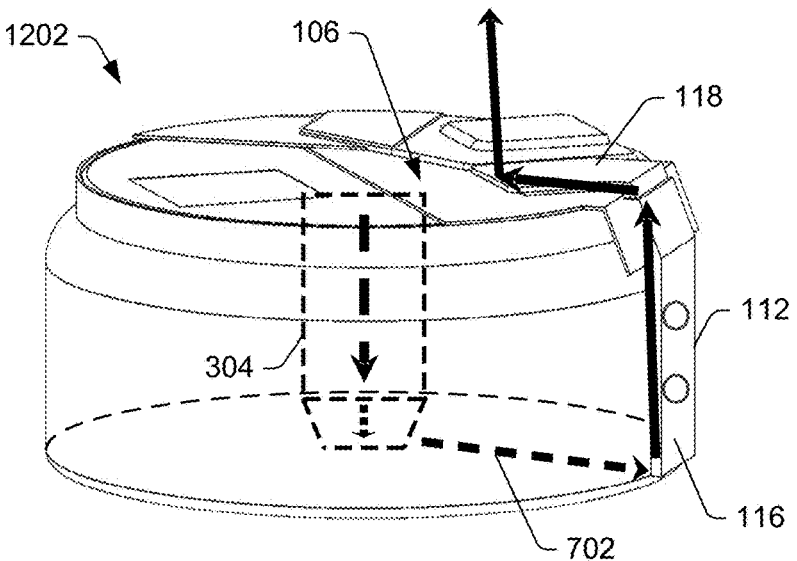
FIG. 13 illustrates a perspective view of the left-side battery from FIG. 12.

FIG. 13 illustrates a perspective view of the left-side battery 1202 from FIG. 12. Here, the path of the electric current 702 runs from the internal positive tab 304 to the first portion 116 of the external positive tab 112 and toward the second portion 118 of the external positive tab 112, which overlaps the top 106 of the left-side battery 1202. Then, the electric current 702 exits the second portion 118 of the external positive tab 112 and runs to an electrically connected device.

Figure 14:
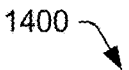
FIG. 14 illustrates a top plan view of the inside of the right-side battery from FIG. 10.
Figure 14:
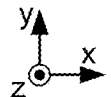
Figure 14:
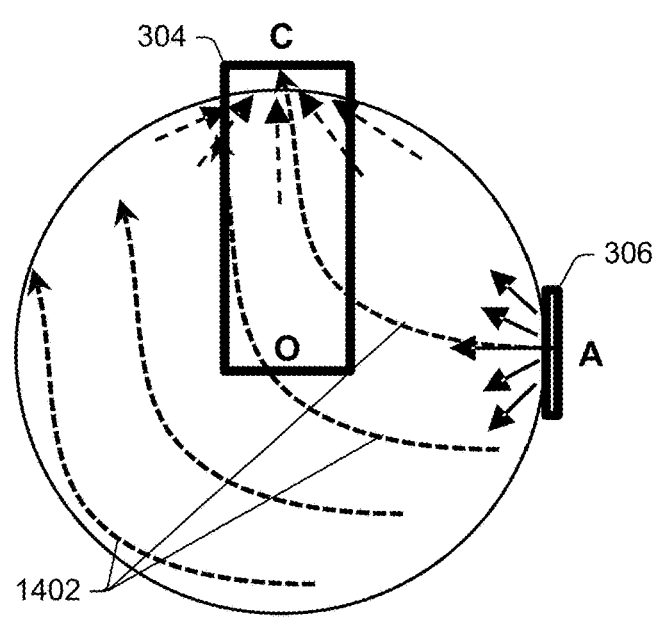

FIG. 14 illustrates a top plan view 1400 of the inside of the coin cell 100 from FIG. 10. In particular, the top plan view 1400 shows the last layer on the bottom of the coin cell 100, where the last layer (e.g., conductive layer) includes a cathode layer 404 and an anode layer 402 separated by an isolation layer (e.g., separator 406), all of which are shown in FIG. 4. Point C is a fold point of the internal positive tab 304. Point A is a fold point of the internal negative tab 306.

Due to the exchange of ions within the battery (e.g., between the anode and cathode layers) and the flow of electrons in a circuit using the battery, current flow can be generalized as the flow of charge (e.g., charged particles that are free to move can conduct current). Accordingly, current 1402 is the flow of charge, which may include ions, electrons, or any other charged particle. An example of current 1402 during discharge of the battery is the electric current 702 from FIG. 7. In FIG. 14, current 1402 is represented as dashed arrows on each conductive layer (including a cathode layer, an anode layer, and a separator). The direction of the arrows shown in the FIG. 14 corresponds to the direction of the positive charge flow during discharge of the battery. In the illustrated example, the current 1402 runs substantially from point A to point C, which may cause magnetic flux with the same direction.

The flow of charge (current 1402) on the anode layer 402 starts at point A (internal negative) and runs all throughout the anode layer 402. A substantial amount of the current 1402 runs from point A to point O, or around point O. During discharge, ions move from the anode layer 402 to the cathode layer 404. The flow of charge (e.g., current 1402) on the cathode layer 404 is collected at point C (internal positive) but begins all throughout the cathode layer 404. In this way, the internal negative tab 306 provides the current 1402 to the anode layers 402 of the stack of layers inside the coin cell 100, and the internal positive tab 304 collects the current 1402 from the cathode layers 404 throughout the stack of layers inside the coin cell 100.

Figure 15A:
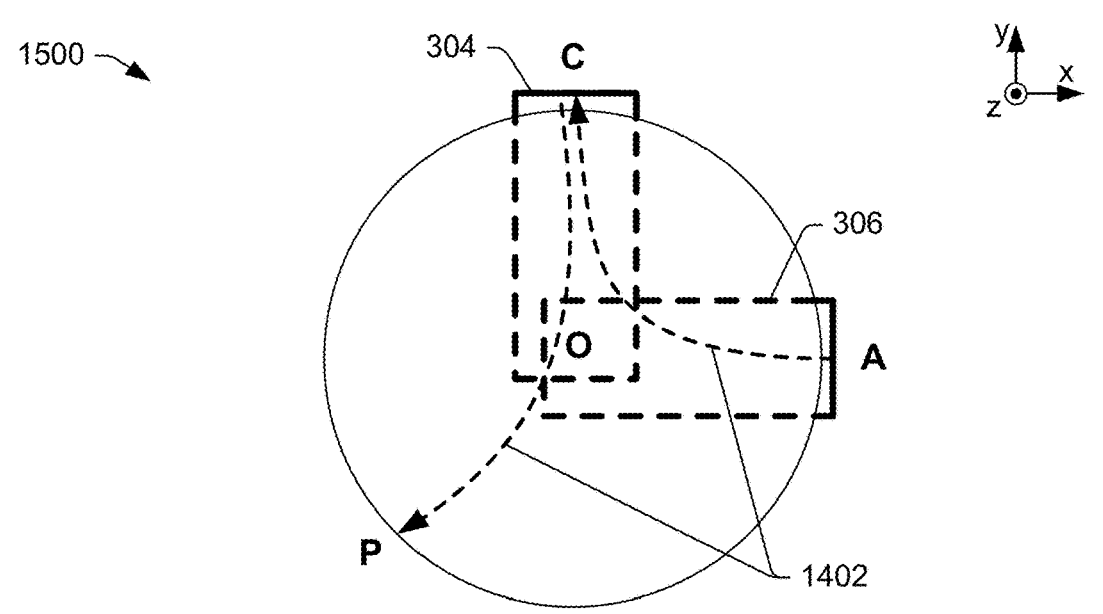
FIG. 15A illustrates a top plan view of the inside of the right-side battery from FIG. 10 showing a general path of the electric current during discharge of the battery.
Figure 15B:
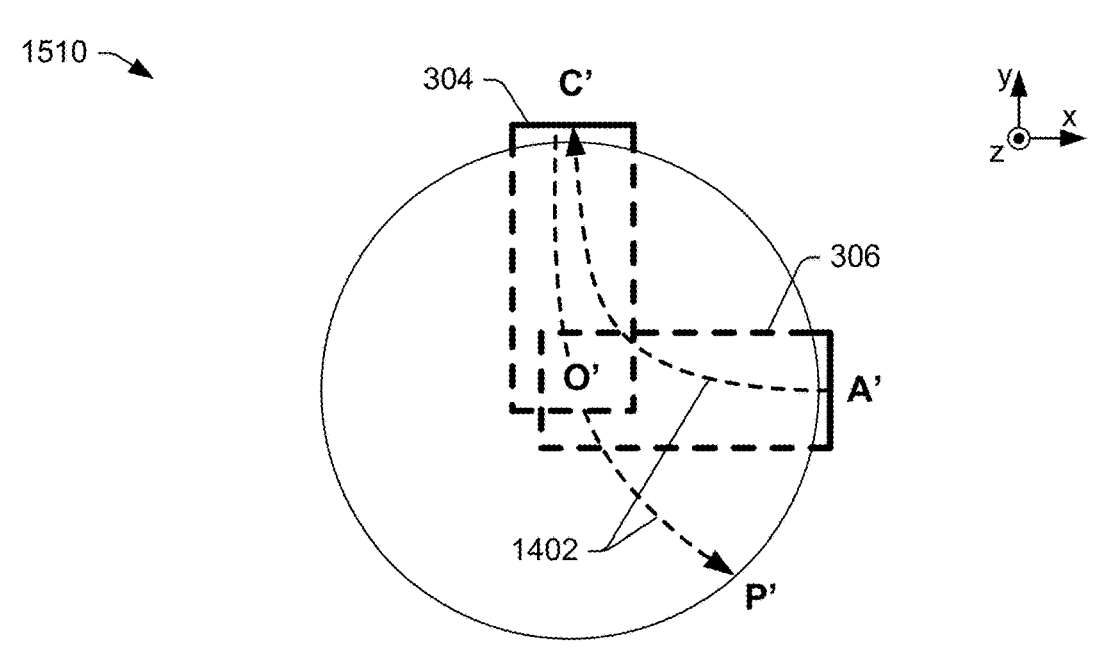
FIG. 15B illustrates a top plan view of the inside of the left-side battery from FIG. 12 showing a general path of electric current during discharge of the battery.

Consider now FIGS. 15A and 15B. FIG. 15A illustrates a top plan view 1500 of the inside of the right-side battery 1002 from FIG. 10 showing a general path of the current 1402 during discharge of the battery. FIG. 15B illustrates a top plan view 1510 of the inside of the left-side battery 1202 from FIG. 12 showing a general path of the current 1402 during discharge of the battery. Point P is the location where the external positive tab 112 on the right-side battery 1002 is connected to the battery can. Point P' is the location where the external positive tab 112 on the left-side battery 1202 is connected to the battery can. Notice that the internal tabs 304 and 306 in both the right-side battery 1002 and the left-side battery 1202 are arranged in the same orientation, but the locations P and P' of the external positive tab 112 on each battery are different. As described herein, when comparing the right-side battery 1002 to the left-side battery 1202, the external tabs are mirrored but the internal tabs match.

In FIG. 15A, the direction of the current 1402 runs from point A to point C to point P. There is magnetic canceling with the current 1402 from point A to point C. Similarly, the direction of the current in FIG. 15B runs from point A' to point C' to point P' and has magnetic canceling with electric current (e.g., the current 1402) from point A' to point C'.

Figures 16A, 16B:
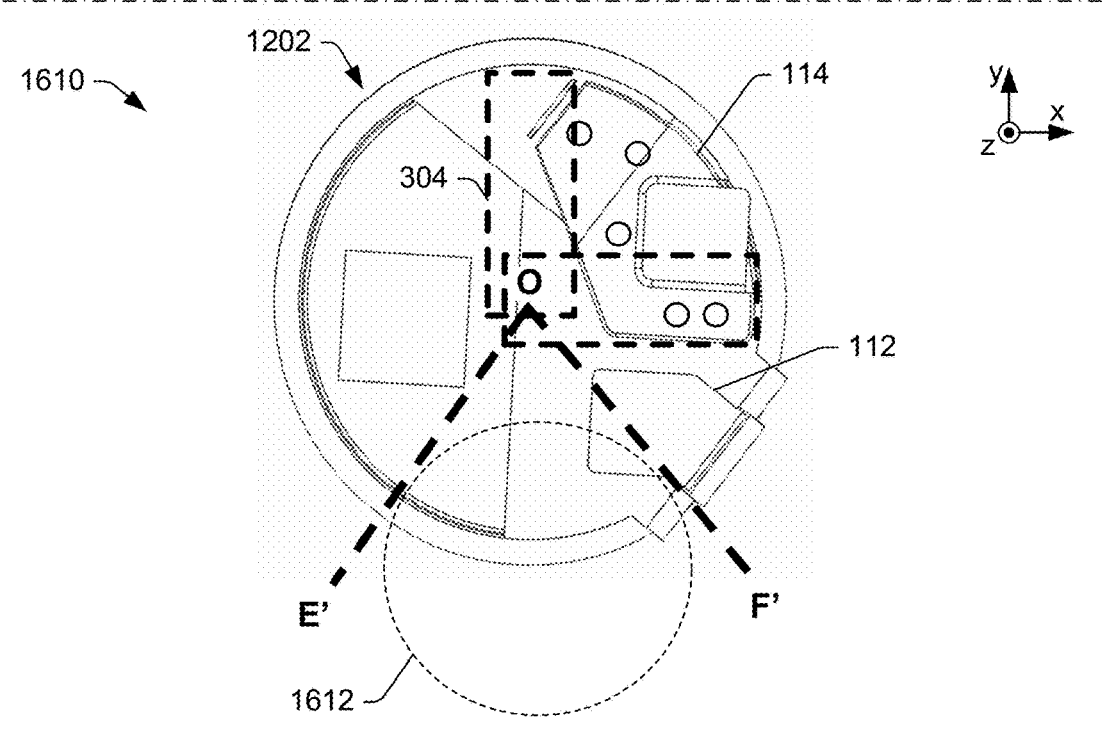
FIG. 16A illustrates an implementation of the right-side battery of FIG. 10 showing an approximate area where an H-field is weakest.
FIG. 16B illustrates an implementation of the left-side battery of FIG. 12 showing an approximate area where the H-field is weakest.

FIG. 16A illustrates an implementation 1600 of the right-side battery 1002 of FIG. 10 showing an approximate area 1602 where the H-field is relatively weakest. For this reason, it is desirable to couple a speaker with the battery over the area defined by the angle E-O-F (e.g., the speaker overlaps with the battery in the area defined by the angle E-O-F). Accordingly, the locations of the external positive tab 112 and the external negative tab 114 reduce the H-field in a volume that is (i) on an opposing side of the central axis 408 from the internal positive tab 304, (ii) bounded by a first line extending from the central axis 408 to the external positive tab 112, and (iii) bounded by a second line extending from the central axis 408 and forming an acute angle with the first line. The external positive tab 112 can be disposed at various locations within the angle E-O-F for the right-side battery 1002.

Similarly, FIG. 16B illustrates an implementation 1610 of the left-side battery 1202 of FIG. 12 showing an approximate area 1612 where the H-field is weakest. For this reason, it is desirable to couple an electronic component (e.g., speaker) with the battery over the area defined by the angle E'-O-F' (e.g., the speaker overlaps with the battery in the area defined by the angle E'-O-F'). The external positive tab 112 can be disposed at various locations within the angle E'-O-F' for the right-side battery 1002.

Figure 17:
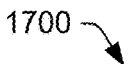
FIG. 17 illustrates a front elevational view of a simplified version of the example coin cell in FIG. 1.
Figure 17:
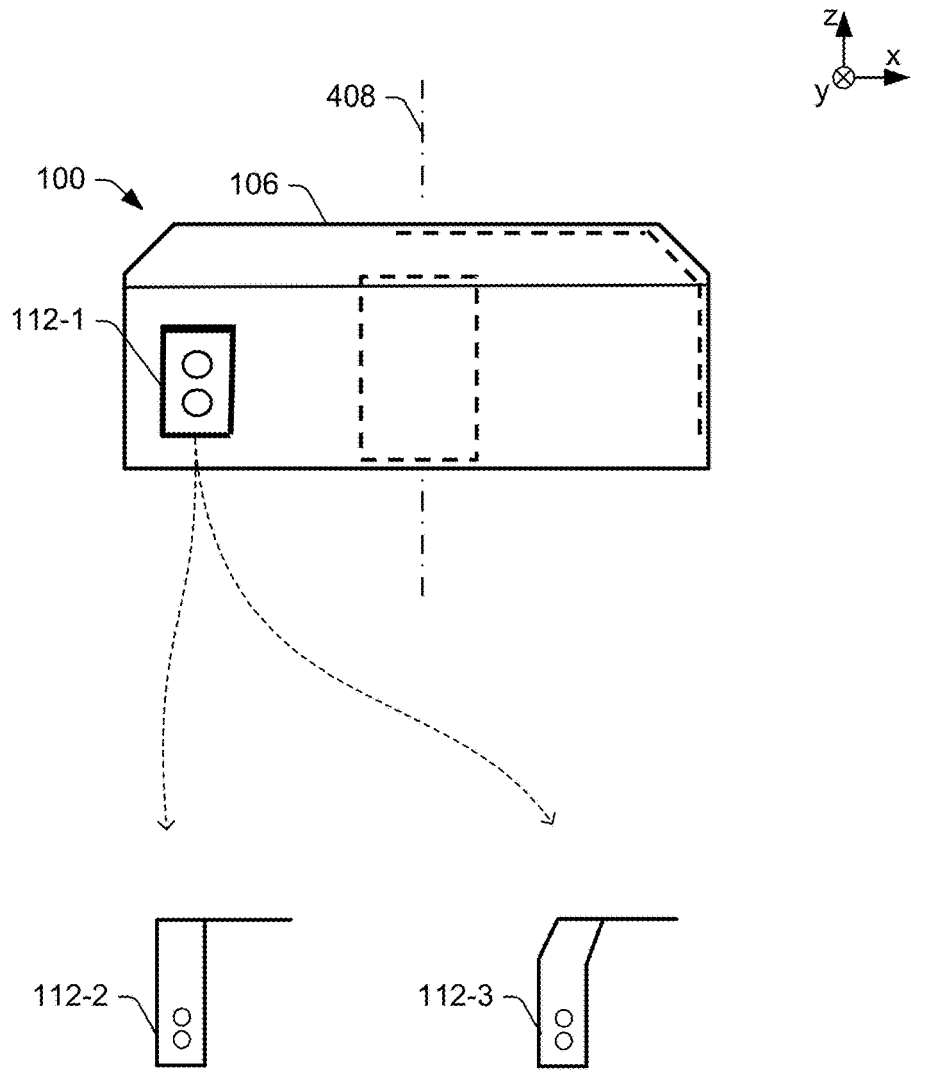

FIG. 17 illustrates a front elevational view 1700 of a simplified version of the example coin cell 100 in FIG. 1. The external positive tab 112 may have any suitable overall shape. Different shapes of the external tabs 112 and 114 may affect the shape of the H-field of the coin cell 100. For example, an L-shaped external tab has certain hot spots that change based on its location on the coin cell 100. The external positive tab 112 and the external negative tab 114 have different H-field shapes due to their different shapes relative to one another and their locations relative to the coin cell 100. In another example, a C-shaped external tab has a completely different H-field shape than that of an L-shaped external tab.

In FIG. 17, the external positive tab 112 is illustrated with example alternative shapes. In one example, the external positive tab 112-1 is short (in the z-direction) in height such that it remains on the side of the coin cell 100 and does not extend to the exterior surface of the top 106 of the coin cell 100. The external positive tab 112 is welded to the side of the coin cell 100. Although not shown, the external positive tab 112 may be elliptical (including circular), triangular, trapezoidal, or any other suitable polygonal shape. In another example, the external positive tab 112-2 extends from the side of the coin cell 100 toward the top 106 of the coin cell 100 and is bent at an approximate 90° angle to extend along the exterior surface of the top 106 of the coin cell 100 toward the central axis 408 of the coin cell 100. In another example, the external positive tab 112-3 is shaped to follow the contour of the enclosure of the coin cell 100 from the sidewall 110 to the top 106 of the coin cell 100. The length (longest dimension, e.g., in extending direction) of the external positive tab 112 can be any suitable length.

Figure 18:
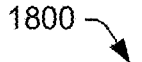
FIG. 18 illustrates a top plan view of a simplified version of the example coin cell in FIG. 1.

FIG. 18 illustrates a top plan view 1800 of a simplified version of the example coin cell 100 in FIG. 1. In the top view of the coin cell 100, the external tabs 112 and 114 may have any suitable shape. In one example, the external positive tab 112-4 may have a shape that extends from the side of the coin cell 100 toward the central axis 408 and curves or turns away from the external negative tab 114. In another example, the external positive tab 112-5 may extend linearly from the side of the coin cell 100 directly toward the central axis 408.

In an example, the external negative tab 114-1 may have a rectangular shape (including a square shape). Alternatively, the external negative tab 114-2 may have an elliptical shape (including a circular shape). In another example, the external negative tab 114-3 may have an irregular shape. The shape of the external negative tab 114 affects the associated H-field generated when electric current runs through the external negative tab 114. Additionally, the shape of the external positive tab 112 affects the associated H-field generated when electric current runs through the external positive tab 112. Accordingly, the shape of the external tabs can be defined, in combination with the relative location of each external tab, to shape the H-field of the coin cell 100 in a way that reduces EMI with adjacent electrical components, including by reducing e-noise when the coin cell 100 is in proximity to a speaker.

Example Device

Figure 19:
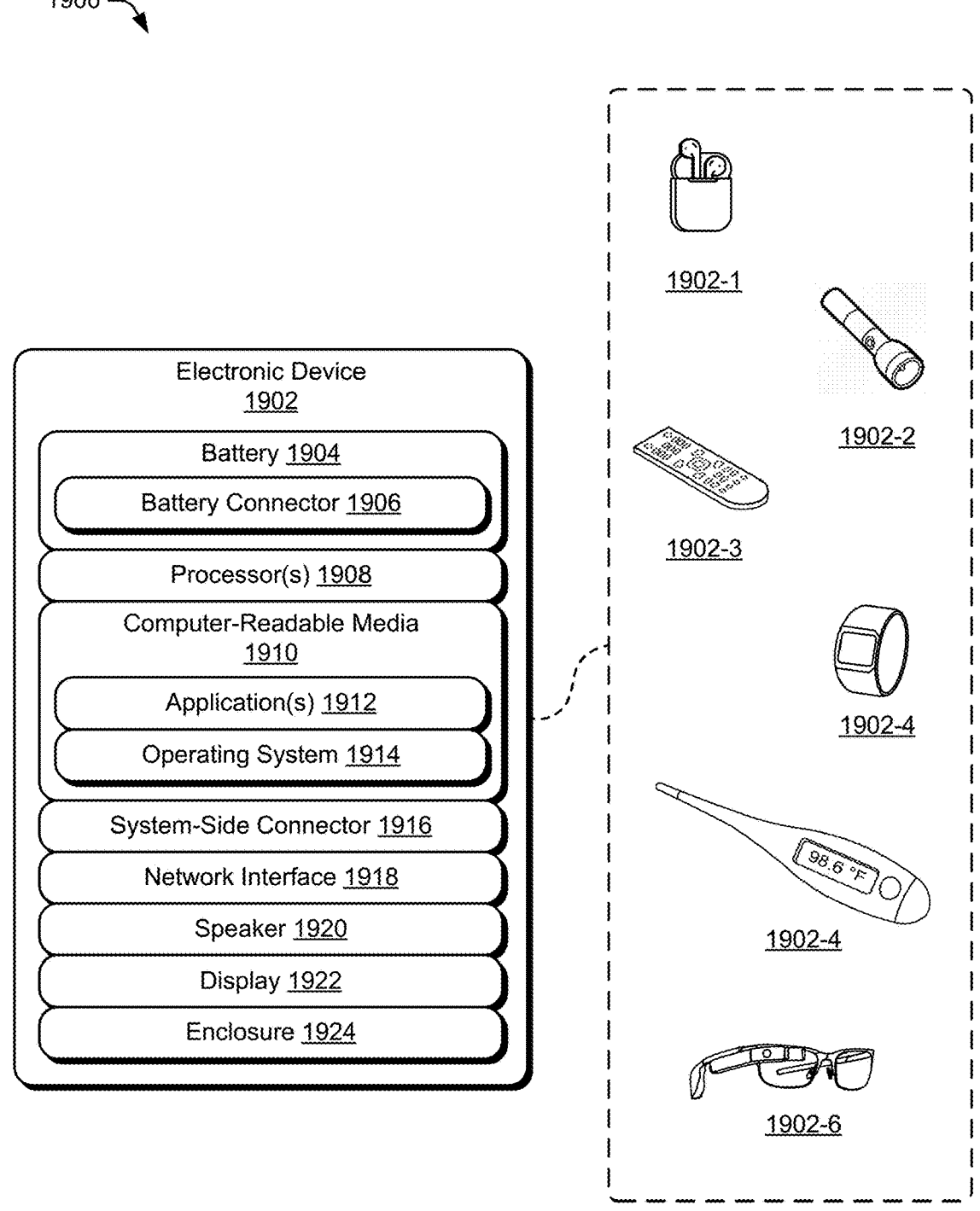
FIG. 19 illustrates an example implementation of an electronic device that can utilize the coin cell from FIG. 1.

FIG. 19 illustrates an example implementation 1900 of an electronic device 1902 that can utilize the coin cell 100 from FIG. 1. The electronic device 1902 is illustrated with a variety of example devices, including wireless earbuds 1902-1, a flashlight 1902-2, a remote control 1902-3, a computing watch 1902-4, an oral thermometer 1902-5, and computing spectacles 1902-6. Note that the electronic device 1902 can be mobile, wearable, non-wearable but mobile, or relatively immobile. The electronic device 1902 is a small form factor device that is battery-powered.

The electronic device 1902 includes a battery 1904 (e.g., coin cell 100). As described herein, the battery 1904 may be a Li-ion battery. Various Li-ion-battery chemistries may be implemented, some examples of which include lithium cobalt oxide (LiCoO2), lithium iron phosphate (LiFePO4), lithium manganese oxide (LiMn2O4 spinel, or Li2MnO3-based lithium-rich layered materials, LMR-NMC), and lithium nickel manganese cobalt oxide (LiNiMnCoO2, Li-NMC, LNMC, NMC, or NCM and the various ranges of Co stoichiometry). Also, Li-ion batteries may include various anode materials, including graphite-based anodes, silicon (Si), graphene, and other cation intercalation/insertion/alloying anode materials. The battery 1904 includes a battery connector 1906 (e.g., external tabs 112 and 114) for physically and electrically coupling to the electronic device 1902 to enable power to transfer from the battery 1904 to the electronic device 1902.

The electronic device 1902 includes one or more processors 1908 (e.g., any of microprocessors, microcontrollers, or other controllers) that can process various computer-executable instructions to control the operation of the electronic device 1902.

The electronic device 1902 also includes a computer-readable media 1910 (CRM 1910) that provides storage for various applications 1912 and system data. The applications 1912 and/or an operating system 1914 implemented as computer-readable instructions on the computer-readable media 1910 (e.g., the storage media) can be executed by the processor(s) 1908 to provide some or all of the functionalities described herein. The computer-readable media 1910 provides data storage mechanisms to store various device applications 1912, the operating system 1914, memory/storage, and other types of information and/or data related to operational aspects of the electronic device 1902. For example, the operating system 1914 can be maintained as a computer application within the computer-readable media 1910 and executed by the processor(s) 1908 to provide some or all of the functionalities described herein. The device applications 1912 may include a device manager, such as any form of a control application, a software application, or signal-processing and control modules.

Various implementations of the application(s) 1912 can include, or communicate with, a System-on-Chip (SoC), one or more Integrated Circuits (ICs), a processor having embedded processor instructions or being configured to access processor instructions stored in memory, hardware with embedded firmware, a printed circuit board (PCB) with various hardware components, or any combination thereof. The PCB may be formed, for example, from glass-reinforced epoxy material such as FR4. In some instances, the PCB may include a single layer of electrically conductive traces and be a single-layer board. In other instances, the PCB may be a multi-layer board that includes multiple layers of electrically conductive traces that are separated by layers of a dielectric material.

The electronic device 1902 may also include a system-side connector 1916, which couples to the battery connector 1906 to provide a physical and electrical connection between the battery connector 1906 and the electronic device 1902. The electronic device 1902 receives electric current from the battery 1904 through the system-side connector 1916 and the battery connector 1906.

The electronic device 1902 may also include a network interface 1918. The electronic device 1902 can use the network interface 1918 for communicating data over wired, wireless, optical, or audio (e.g., acoustic) networks. By way of example and not limitation, the network interface 1918 may communicate data over a local area network (LAN), a wireless local area network (WLAN), a home area network (HAN), a personal area network (PAN), a wide area network (WAN), an intranet, the Internet, a peer-to-peer network, a point-to-point network, or a mesh network. The network interface 1918 can be implemented as one or more of a serial and/or parallel interface, a wireless interface, any type of network interface, a modem, or any other type of communication interface. Using the network interface 1918, the electronic device 1902 may communicate via a cloud computing service to access a platform having resources.

The electronic device 1902 may also include a speaker 1920. The speaker 1920 can include any suitable speaker for outputting audio signals, whether for notifications, alerts, music, speech, or other audio messages for a user. The speaker 1920 may be integrated within the electronic device 1902 such that the speaker 1920 is located within a housing of the electronic device 1902.

The electronic device 1902 may also include a display 1922 (e.g., display device 1922). The display 1922 can include any suitable touch-sensitive display device, such as a touchscreen, a liquid crystal display (LCD), a thin-film transistor (TFT) LCD, an in-place switching (IPS) LCD, a capacitive touchscreen display, an organic light-emitting diode (OLED) display, an active-matrix organic light-emitting diode (AMOLED) display, a super AMOLED display, and so forth. The display 1922 may be referred to as a display or a screen, such that digital content may be displayed on-screen.

The electronic device 1902 also includes an enclosure 1924 (e.g., housing). The enclosure 1924 houses the various components of the electronic device 1902, including, for example, the battery 1904 and the speaker 1920. In aspects, the enclosure 1924 can include seals to prevent dust and water ingress into the circuitry and other components housed within the enclosure 224.

Many components described herein are arranged within the enclosure 1924, including the system-side connector 1916, one or more printed circuit boards, the battery 1904, and so forth. The enclosure 1924 includes a space or receptacle for receiving the battery 1904, which is electrically couplable to the system-side connector 1916. The system-side connector 1916 is attached to a circuit board, including a printed circuit board (PCB) (e.g., main logic board) of the electronic device 1902, where the PCB is also arranged within the enclosure 1924. Accordingly, the battery 1904 (including the battery connector 1906) and the system-side connector 1916 are internal to the electronic device 1902. In aspects, the system-side connector 1916 and the battery 1904 do not include ports facing outward (externally) from the electronic device 1902.

Some examples are described below:

A battery (100) comprising: a battery can comprising a top can (102) and a bottom can (104), the top can (102) disposed at least partially within the bottom can (104) to provide an enclosure having a central axis (408), the top can (102) defining a top of the enclosure, the top having a top exterior surface defining an xy-plane, the bottom can (104) defining a base (108) and a sidewall (110) of the enclosure, the sidewall (110) being substantially orthogonal to the xy-plane, the battery can being insulated over exterior surfaces of the battery can; a plurality of layers stacked within the enclosure between the base (108) and the top; an internal negative tab (306) for providing current to the plurality of layers, the internal negative tab (306) being adjacent to a first location on an interior surface of the sidewall (110) of the enclosure; an internal positive tab (304) for collecting the current within the plurality of layers, the internal positive tab (304) being adjacent to a second location on the interior surface of the sidewall (110) of the enclosure that is different from the first location; an external negative tab (114) connected to the top exterior surface of the enclosure at a third location and defining a negative terminal for the battery (100); and an external positive tab (112) connected to an exterior surface of the sidewall (110) of the enclosure at a fourth location and defining a positive terminal for the battery (100), the central axis (408) being between the fourth location on the exterior surface of the sidewall (110) and the second location on the interior surface of the sidewall (110).

A coin cell (100) comprising: a battery can having a positive terminal and a negative terminal, the battery can having a general cylindrical shape with a central axis (408); an internal negative tab (306) disposed within the battery can and configured to connect a plurality of cathode layers (404) to the negative terminal; an internal positive tab (304) disposed within the battery can and configured to connect a plurality of anode layers (402) to the positive terminal; an external negative tab (114) connected to the negative terminal; and an external positive tab (112) connected to the positive terminal, the external negative tab (114) and the external positive tab (112) being disposed at locations that are predefined relative to the internal positive tab (304) and the internal negative tab (306) to reduce an H-field generated when current runs through the coin cell (100), the central axis (408) being located between the external positive tab (112) and the internal positive tab (304), the H-field being reduced in a volume over the negative terminal that is on an opposing side of the external positive tab (112) from the external negative tab (114).

CONCLUSION

Although aspects of a battery configuration for reducing electromagnetic interference have been described in language specific to features and/or methods, the subject of the appended claims is not necessarily limited to the specific features or methods described. Rather, the specific features and methods are disclosed as example implementations of the techniques for a battery configuration for reducing electromagnetic interference, and other equivalent features and methods are intended to be within the scope of the appended claims. Further, various different aspects are described, and it is to be appreciated that each described aspect can be implemented independently or in connection with one or more other described aspects.

What is claimed is:

1. A battery comprising:

a battery can comprising a top can and a bottom can, the top can disposed at least partially within the bottom can to provide an enclosure having a central axis, the top can defining a top of the enclosure, the top having a top exterior surface defining an xy-plane, the bottom can defining a base and a sidewall of the enclosure, the sidewall being substantially orthogonal to the xy-plane, the battery can being insulated over exterior surfaces of the battery can;

a plurality of layers stacked within the enclosure between the base and the top;

an internal negative tab for providing current to the plurality of layers, the internal negative tab being adjacent to a first location on an interior surface of the sidewall of the enclosure;

an internal positive tab for collecting the current within the plurality of layers, the internal positive tab being adjacent to a second location on the interior surface of the sidewall of the enclosure that is different from the first location;

an external negative tab connected to the top exterior surface of the enclosure at a third location and defining a negative terminal for the battery; and an external positive tab connected to an exterior surface of the sidewall of the enclosure at a fourth location and defining a positive terminal for the battery, wherein a line, which is parallel to the xy-plane and passes through the central axis and the first location, is between the fourth location and the second location.

2. The battery of claim 1, wherein:

the external negative tab has a first shape;

the external positive tab has a second shape; and the first and second shapes are configured to shape an H-field, generated by the current running through the battery, to reduce electromagnetic coupling with an electronic circuit in proximity to the top of the enclosure.

3. The battery of claim 1, wherein the external positive tab extends to overlap the top exterior surface of the battery can.

4. The battery of claim 3, wherein the external positive tab is bent to follow a contour of the enclosure from the sidewall to the top exterior surface.

5. The battery of claim 3, wherein:

the external positive tab includes first and second portions connected together;

the first portion is connected to the exterior surface of the sidewall of the battery can at the fourth location; and the second portion extends to overlap the top exterior surface of the battery can without connecting to the top exterior surface of the battery can.

6. The battery of claim 5, further comprising a cover that covers and insulates the first portion of the external positive tab.

7. The battery of claim 5, wherein the second portion of the external positive tab extends toward the central axis of the battery can.

8. The battery of claim 1, wherein, relative to the central axis, the fourth location, where the external positive tab is connected to the exterior surface of the sidewall, is within a range of 90 degrees to 180 degrees from the second location, where the internal positive tab connects to the interior surface of the sidewall.

9. The battery of claim 1, wherein, relative to the central axis, the fourth location, where the external positive tab is connected to the exterior surface of the sidewall, is within a range of −90 degrees to −180 degrees from the second location, where the internal positive tab connects to the interior surface of the sidewall.

10. The battery of claim 1, wherein:

in a right-side battery configuration, the external positive tab and the external negative tab are seperated from the internal negative tab by a line that is parallel to the xy-plane and that passes through the central axis and the second location; and in a left-side battery configuration, the external positive tab and the external negative tab are disposed on a same side of the y-axis as the internal negative tab.

11. The battery of claim 1, wherein the first location and the second location are approximately 90 degrees apart relative to the central axis.

12. The battery of claim 1, wherein the external negative tab and the external positive tab are configured, based on the third and fourth locations, respectively, to reduce an H-field, generated when current runs through the battery, in a volume that is:

on an opposing side of the x-axis from the internal positive tab;

bounded by a first line extending from the central axis to the external positive tab; and bounded by a second line extending from the central axis and forming an acute angle with the first line.

13. The battery of claim 1, wherein the external positive tab enables the current to run from the sidewall of the enclosure to a location overlapping the top exterior surface.

14. The battery of claim 1, wherein the external negative tab is welded to the top exterior surface of the enclosure and the external positive tab is welded to the exterior surface of the sidewall of the enclosure.

15. The battery of claim 1, wherein the third and fourth locations are defined relative to the first and second locations to reduce harmonics associated with at least 800 Hertz, 1600 Hertz, and 3200 Hertz.

16. The battery of claim 1, wherein the battery is a coin cell.

17. A coin cell comprising:

a battery can having a positive terminal and a negative terminal, the battery can having a general cylindrical shape with a central axis;

an internal negative tab disposed within the battery can and configured to connect a plurality of cathode layers to the negative terminal;

an internal positive tab disposed within the battery can and configured to connect a plurality of anode layers to the positive terminal;

an external negative tab connected to the negative terminal; and an external positive tab connected to the positive terminal, the external negative tab and the external positive tab being disposed at locations that are predefined relative to the internal positive tab and the internal negative tab to reduce an H-field generated when current runs through the coin cell, a line that passes through the first location and a centroid of the battery can is located between the external positive tab and the internal positive tab, the H-field being reduced in a volume over the negative terminal that is on an opposing side of the external positive tab from the external negative tab.

18. The coin cell of claim 17, wherein the external positive tab extends to at least partially overlap the negative terminal.

19. The coin cell of claim 17, further comprising an insulating layer disposed between the battery can and the external positive tab and between the battery can and the external negative tab, wherein the external negative tab and the external positive tab are each connected to the battery can via one or more weld points that extend through the insulating layer for conductivity.

20. The coin cell of claim 17, wherein the external negative tab and the external positive tab are configured to cause the negative terminal and the positive terminal, respectively, to be located proximate to one another on a same side of the battery can.

\* \* \* \* \*